Aug. 7, 1956 R. H. BRYANT ET AL 2,757,884
TRAVERSE MECHANISM
Filed Nov. 20, 1953 2 Sheets-Sheet 2
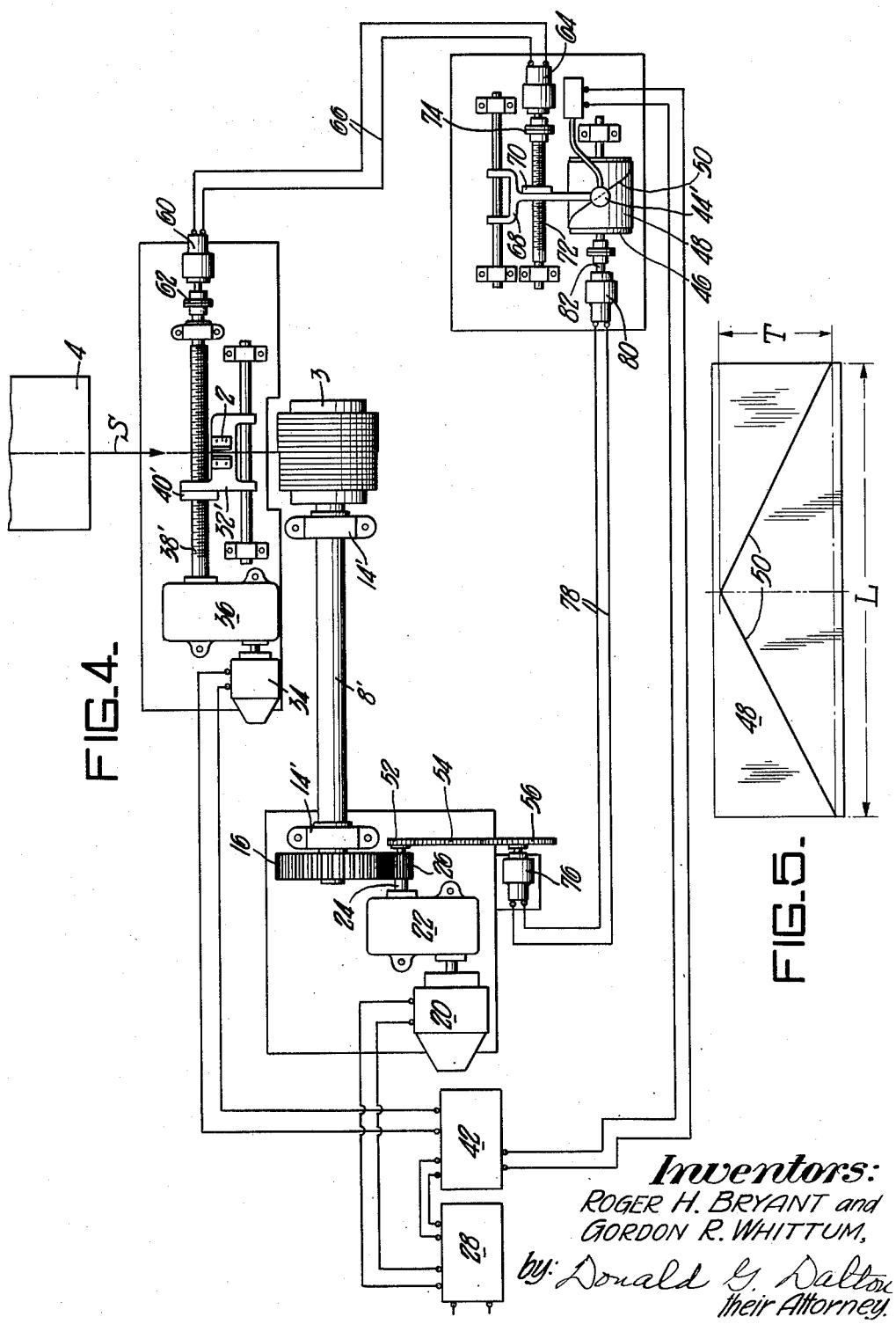
Inventors:
ROGER H. BRYANT and
GORDON R. WHITTUM,
by: Donald G. Dalton
their Attorney.

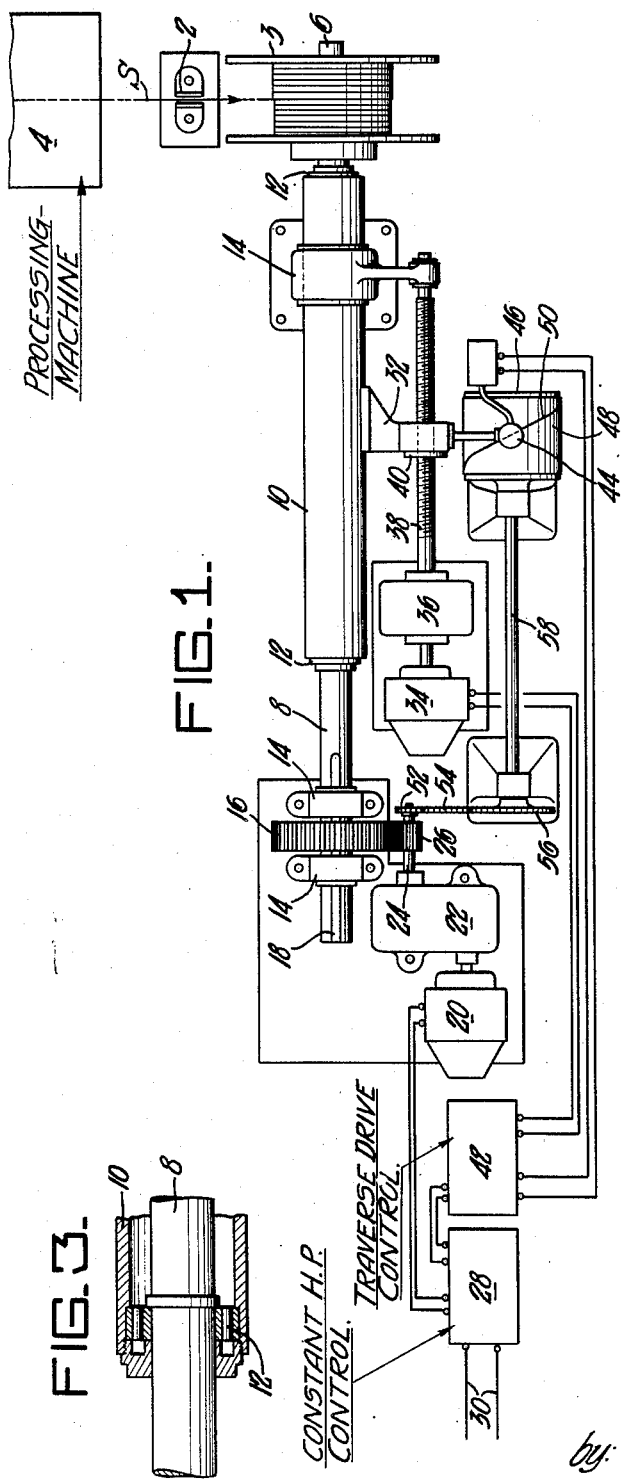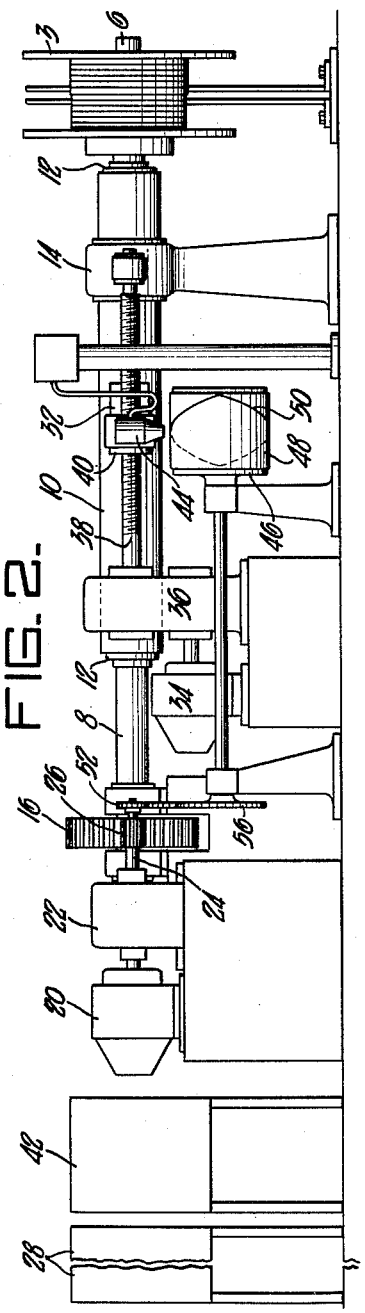
Inventors:
ROGER H. BRYANT and
GORDON R. WHITTUM,
by: Donald G. Dalton
their Attorney.

United States Patent Office 2,757,884
Patented Aug. 7, 1956

2,757,884
TRAVERSE MECHANISM

Roger H. Bryant, Worcester, and Gordon R. Whittum, Auburn, Mass., assignors to United States Steel Corporation, a corporation of New Jersey Application November 20, 1953, Serial No. 393,412

4 Claims. (Cl. 242—158)

This invention relates to a spooler or the like and more particularly to such a spooler for spooling elongated strands on a spool which may be a plain drum. The elongated strands may be wire, thread, rope or the like. In so spooling strands it is desired to obtain a uniform distribution of the material across the face of the spool in order to utilize the available space to best advantage, prevent kinks, prevent flat material from turning on its edges, etc. The strand is generally fed to the spool in a single plane and the spool reciprocates as it rotates. The reciprocation may be obtained by the use of cams, reversible screw threads, or the like, with the reciprocation being synchronized with the rotation of the spool. It has been customary to drive the reciprocating mechanism from the spool rotating means in order to obtain this synchronization. There are two objections to this method. The power required to operate the reciprocating mechanism may not be constant for various reasons and since the horse power delivered by the motor for rotating the spool is constant the power actually used in rotating the spool will vary, thus resulting in an uneven tension on the strands. The second objection is that the pattern of the distribution cannot be changed readily; in other words, the relationship between the velocity and reciprocation of the spool cannot be changed without changing the cam or the reversible screw threads.

It is therefore an object of our invention to provide a spooler in which the horse power for rotating the spool is constant at all times.

Another object is to provide such a spooler in which the pattern of distribution of the strand on the spool may be readily changed.

These and other objects will be more apparent after referring to the following specification and attached drawings, in which:

Figure 1 is a plan view of the spooler with certain parts thereof being shown schematically;

Figure 2 is a front elevation of Figure 1;

Figure 3 is a sectional view of a detail;

Figure 4 is a view, similar to Figure 1, showing a second embodiment of our invention; and Figure 5 is a developed view of a graph used with either embodiment of our invention.

Referring more particularly to Figures 1 and 2 of the drawings, the reference numeral 2 indicates a guide for a strand S being fed to a spool 3 from a processing machine 4. The spool 3 is mounted on a chuck 6 in the usual manner. The chuck 6 is mounted on a drive shaft 8 which in turn is rotatably supported in a quill 10 by means of roller bearings 12 at each end thereof. As clearly shown in Figure 3, the bearings 12 are mounted so as to prevent axial movement between shaft 8 and quill 10. The quill 10 is mounted for reciprocation in bearings 14. A gear 16 is mounted on the shaft 8 for rotation therewith but the shaft 8 is movable axially with respect to the gear 16 by means of spline connection 18. The gear 16 is rotated from a constant horse power motor 20 through a gear reducer 22, a shaft 24 and pinion 26. The motor 20 is provided with power from a constant horse power control 28 which is connected to the power lines 30. A bracket 32 is secured to the quill 10 for movement therewith. The quill 10 is reciprocated by means of a motor 34 through a gear reducer 36, reversible screw thread 38 and a nut 40 secured to the bracket 32. Operation of the motor 34 is controlled by means of a control 42 which is provided with power from the constant horse power control 28. A photoelectric scanning head 44 is mounted on the end of the bracket 32 above a rotating cylinder 46. A graph paper 48 having a guide or graph line 50 thereon is mounted on the rotating cylinder 46. The graph line 50 indicates the desired relationship between the angular velocity and the axial movement of the spool 4. It will be apparent that the graph line may be readily changed so that the pattern of the distribution of the strand can be changed as desired. The scanning head 44 may be operated on reflected light or a light may be provided inside the cylinder so as to operate the scanning head by transmitted light. In the latter case the guide line 50 may be opaque and the cylinder translucent or an opaque cylinder having a translucent guide line may be used. The cylinder 46 is rotated from the shaft 24 by means of a sprocket 52 secured to the shaft 24, a chain 54 and a sprocket 56 secured to shaft 58 attached to the cylinder 46.

The operation of the device is as follows:

If uniform distribution is wanted on spool 3, the graph line 50 will be arranged as shown in Figure 5 in which T indicates the actual amount of the traverse and L is the total circumference of the cylinder. If more space is needed for the strand at either end or at the middle of the spool, the shape of line 50 can be changed to deviate from a straight line to shorten or lengthen the time in any particular area. The graph line 50 may be arranged to provide for any number of turns per layer on the spool by arranging the ratio between sprockets 52 and 56 so that the spool makes that number of turns for each turn of the cylinder. Thus, if the traverse of the spool is 10" and the strip is ½" wide there will be twenty turns of strip per layer if it is desired to have the strip edges abut. The drive ratio between the spool and the cylinder would be 40 to 1 under these conditions. Assuming that the graph line 50 is arranged to get the desired results, the motor 20 will be set in operation with the strand S attached to the spool. This will rotate the spool and cause the strand S to wrap therearound. Since the scanning head 44 is above the line 50, the motor 34 will not operate. However, as soon as the motor 20 starts to turn the cylinder 46 will also turn at a speed proportional to that of the spool 3 and the scanning head 44 will move from the graph line 50. This will generate a current which will be delivered to the control 42 to operate the motor 34 which in turn will move the quill 10 and return the head 44 to the line 50. Thus, the axial movement of the quill 10 and the spool 3 will conform to the graph line 50.

Figure 4 shows a second embodiment of our invention in which the guide 2 is reciprocated instead of the spool 3 and different means are provided for rotating the cylinder 46 at an angular velocity proportional to that of the spool 3 and for moving the scanning head 44 axially of said cylinder a distance proportional to the relative axial movement of the strand and spool. In this embodiment of our invention a screw 38' is threaded into a nut 40' on a bracket 32' attached to the guide 2. A Selsyn transmitter 60 is connected to the screw 38' by means of a coupling 62. The Selsyn transmitter 60 is connected to a Selsyn receiver 64 by means of the wires 66. A scanning head 44' is mounted on a bracket 68 which is provided with a nut 70 for receiving a screw 72 which is connected to the Selsyn receiver 64 by means of a coupling 74. In this manner the scanning head 44' is made to move axially of the cylinder 46' a distance proportional to the axial movement of the guide 2. A Selsyn transmitter 76 is connected for rotation with the sprocket 56 and is connected by means of the wires 78 to a Selsyn receiver 80 mounted on the shaft 82 of the cylinder 46. In this manner the cylinder 46 is rotated at an angular velocity proportional to the angular velocity of the spool 3. As the scanning head 44' follows the line 50, the guide 2 is reciprocated to move the strand S in the desired pattern across the spool 3. The operation and construction of this device is otherwise the same as that of Figure 1.

The above described controls and apparatus will operate in the same manner if a constant torque motor is substituted for the constant H. P. motor 20. This will result in a gradual change in the tension applied to the strand S but such change will not be so great as to prevent proper operation of the spooler.

While several embodiments of our invention have been shown and described it is apparent that other adaptations and modifications may be made without departing from the scope of the following claims.

We claim:

1. Apparatus for spooling elongated strands on a spool comprising means for rotating said spool, separate means for causing relative reciprocation of the spool and strand, a rotating cylinder, a guide line on said cylinder, means for rotating said cylinder at an angular velocity proportional to the angular velocity of the spool, a photo-electric scanning head mounted to follow said guide line, means for moving said scanning head axially of said cylinder a distance proportional to the relative axial movement of said spool and strand, and a control actuated by movement of said scanning head from said line to operate said reciprocating means to return said scanning head to said line.

2. Apparatus for spooling elongated strands on a spool comprising means for rotating said spool, separate means for causing relative reciprocation of the spool and strand, a guide line for indicating the desired relationship between the angular velocity and relative axial movement of said spool and strand, a photo-electric scanning head mounted to follow said guide line, and a control actuated by movement of said scanning head from said line to operate said reciprocating means to return said scanning head to said line.

3. Apparatus for spooling elongated strands on a spool comprising means for rotating said spool, separate means for causing relative reciprocation of the spool and strand, a guide line for indicating the desired relationship between the angular velocity and relative axial movement of said spool and strand, a photo-electric scanning head mounted to follow said guide line, means for moving said scanning head axially of said cylinder a distance proportional to the relative axial movement of said spool and strand, and a control actuated by movement of said scanning head from said line to operate said reciprocating means to return said scanning head to said line.

4. Apparatus for spooling elongated strands on a spool comprising means for rotating said spool, separate means for causing relative reciprocation of the spool and strand, a rotating cylinder, a guide on said cylinder, means for rotating said cylinder at an angular velocity proportional to the angular velocity of the spool, a head mounted to follow said guide, means for moving said head axially of said cylinder proportional to the relative axial movement of said spool and strand, and a control actuated by movement of said head from said guide to operate said reciprocating means to return said head to said guide.

References Cited in the file of this patent

UNITED STATES PATENTS

| 1,120,172 | Trotter et al. | Dec. 8, 1914 |
| 2,108,410 | Perry | Feb. 15, 1938 |
| 2,672,198 | Jones et al. | Mar. 16, 1954 |
| 2,672,299 | Jones | Mar. 16, 1954 |